(12) United States Patent
Dyer et al.

(10) Patent No.: US 11,275,008 B2
(45) Date of Patent: Mar. 15, 2022

(54) MEASURING DENSITY OF AIRCRAFT FUEL USING A CENTRIFUGAL FLUID PUMP

(71) Applicant: Hamilton Sundstrand Corporation, Charlotte, NC (US)

(72) Inventors: Gerald P. Dyer, Suffield, CT (US); Charles E. Reuter, Granby, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 16/659,150

(22) Filed: Oct. 21, 2019

(65) Prior Publication Data

US 2021/0116346 A1    Apr. 22, 2021

(51) Int. Cl.

| G01N 9/26 | (2006.01) |
|---|---|
| F04D 17/08 | (2006.01) |
| G01N 9/30 | (2006.01) |
| F02C 7/22 | (2006.01) |
| F02C 9/26 | (2006.01) |

(52) U.S. Cl.
CPC ............... G01N 9/26 (2013.01); F02C 7/22 (2013.01); F02C 9/263 (2013.01); F04D 17/08 (2013.01); G01N 9/30 (2013.01)

(58) Field of Classification Search
CPC .... G01N 9/26; G01N 9/30; F02C 7/22; F02C 7/236; F02C 9/263; F04D 17/08
See application file for complete search history.

(56) References Cited

U.S. PATENT DOCUMENTS

| 2,715,831 | A | | 8/1955 | Catford et al. |
| 3,028,748 | A | * | 4/1962 | Frantz ..................... G01N 9/30 |
| | | | | 73/32 R |
| 3,368,387 | A | | 2/1968 | Sion |
| 3,453,868 | A | | 7/1969 | Williams, Jr. |
| 4,332,527 | A | | 6/1982 | Moldovan et al. |
| 5,873,696 | A | * | 2/1999 | Harada ............... F04D 27/0246 |
| | | | | 415/148 |
| 2008/0179092 | A1 | * | 7/2008 | Fragachan ............ B01F 3/1271 |
| | | | | 175/24 |
| 2009/0013867 | A1 | * | 1/2009 | McCutchen ........... B01D 45/14 |
| | | | | 95/35 |
| 2017/0030359 | A1 | * | 2/2017 | Fowler ...................... F04D 7/04 |
| 2017/0114787 | A1 | * | 4/2017 | Brookes .................... F04D 1/00 |
| 2017/0198699 | A1 | * | 7/2017 | Laue ....................... G01F 5/005 |

FOREIGN PATENT DOCUMENTS

| FR | 2482301 A1 | 11/1981 |
| SU | 1242755 A1 | 7/1986 |
| WO | 9724596 A1 | 7/1997 |

OTHER PUBLICATIONS

English Translation of FR2482301.*
Extended European Search Report dated Jul. 8, 2020, received for corresponding for European Application No. 19215367.4, 9 pages.

* cited by examiner

Primary Examiner — Helen C Kwok
(74) Attorney, Agent, or Firm — Kinney & Lange, P.A.

(57) ABSTRACT

Apparatus and associated methods relate to measuring density of aircraft fuel. The aircraft fuel is circumferentially pumped about an impeller axis by a centrifugal pump. Differential pressure of the aircraft fuel is measured between two different points within the centrifugal pump, each a different radial distance from an impeller axis. Rotational frequency of the impeller of the centrifugal pump is measured. Density of the aircraft fuel is calculated based on the rotational frequency and the differential pressure.

16 Claims, 4 Drawing Sheets

MEASURING DENSITY OF AIRCRAFT FUEL USING A CENTRIFUGAL FLUID PUMP

BACKGROUND

Fuel metering of an aircraft involves measurement of fuel density, which can change in response to changes in conditions. Temperature, for example, affects the density of fuels used in aircraft engines. The amount of energy contained in a particular volume of fuel is dependent on the density of the fuel. Thus, aircraft fuel systems measure density of the fuel so that accurate metering of fuel to the engines can be performed. Temperature variations, pressure variations and vibrations that are experienced on an aircraft in flight can make accurate measurements of fuel density difficult.

SUMMARY

Apparatus and associated methods relate to a system for measuring density of aircraft fuel. The system includes a centrifugal pump, speed sensing and pressure sensing arrangements, and a processor. The centrifugal pump includes an impeller configured to pump the aircraft fuel. The speed sensing arrangement is configured to determine a rotational frequency of the impeller while the centrifugal pump is pumping the aircraft fuel. The Pressure sensing arrangement is configured to measure pressure at two points within the centrifugal pump or a differential pressure between the two points while the centrifugal pump is pumping the aircraft fuel. The processor is configured to calculate a density of the aircraft fuel based on the rotational frequency and either the two measured pressures or the measured differential pressure.

Some embodiments relate to a method for measuring density of aircraft fuel. The method includes pumping the aircraft fuel with a centrifugal pump. The method includes measuring pressure at two different points within the centrifugal pump. The method includes measuring a rotational frequency of an impeller of the centrifugal pump. The method also includes calculating a density of the aircraft fuel based on the rotational frequency and the two measured pressures.

DETAILED DESCRIPTION

Apparatus and associated methods relate to measuring density of an aircraft fuel. A pump casing of a centrifugal fluid pump is filled with a first fluid. A pressure equalization port equalizes pressure thereacross between the first fluid inside the pump casing and a second fluid outside the pump casing. The second fluid is in pressure communication with the aircraft fuel. Rotating an impeller within the pump casing about and impeller axis causes the first fluid to be rotationally circulated about the impeller axis. Density of the aircraft fuel is calculated based on a first and second fluid pressures measured at first and second radial distances from the impeller axis.

Figure 1:
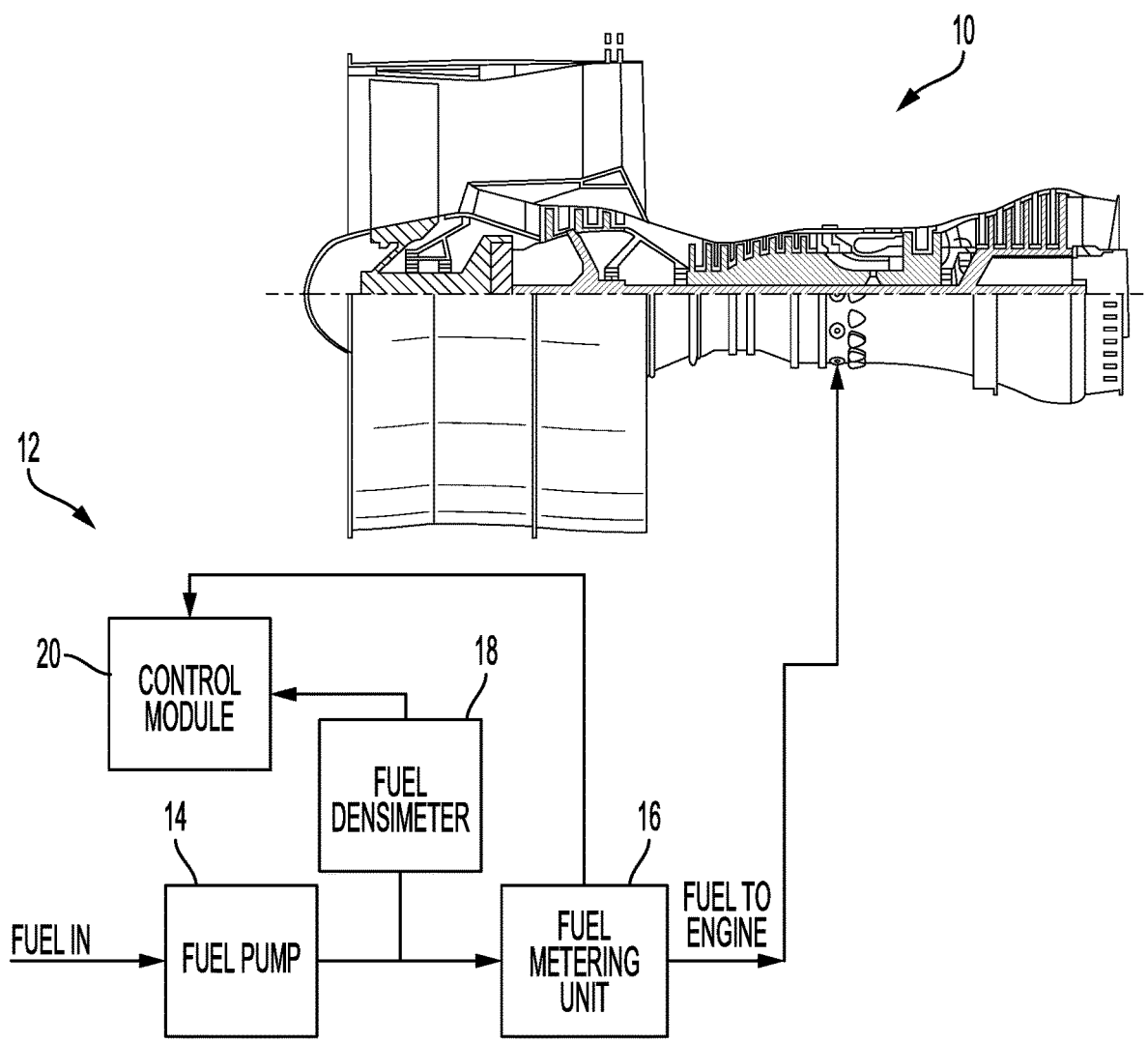
FIG. 1 is a schematic view of an aircraft engine supplied with fuel by a fuel system that simultaneously pumps and measures density of aircraft fuel using a single impeller.

FIG. 1 is a schematic view of an aircraft engine configured to be supplied with aircraft fuel by a fuel system. In FIG. 1, aircraft engine 10 includes fuel system 12. Fuel system 12 includes fuel pump 14, fuel metering unit 16, Fuel densimeter 18, and fuel control module 20.

Fuel pump 14 receives fuel from a fuel inlet port connected to a fuel line and pumps the received fuel to an outlet port. Fuel densimeter 18 receives the fuel from the outlet port of fuel pump 14, measures the density of the fuel, and provides fuel control module 20 a signal indicative of the measured density of the fuel. Fuel control module 20 controls the fuel metering unit 16, based at least in part on the measured density of the fuel. Fuel metering unit 16 then meters the fuel provided to aircraft engine 10 as controlled by fuel control module 20. Fuel densimeter includes a centrifugal pump and pressure sensors configured to measure fluid pressure at various radial distances from an impeller axis.

Figure 2:
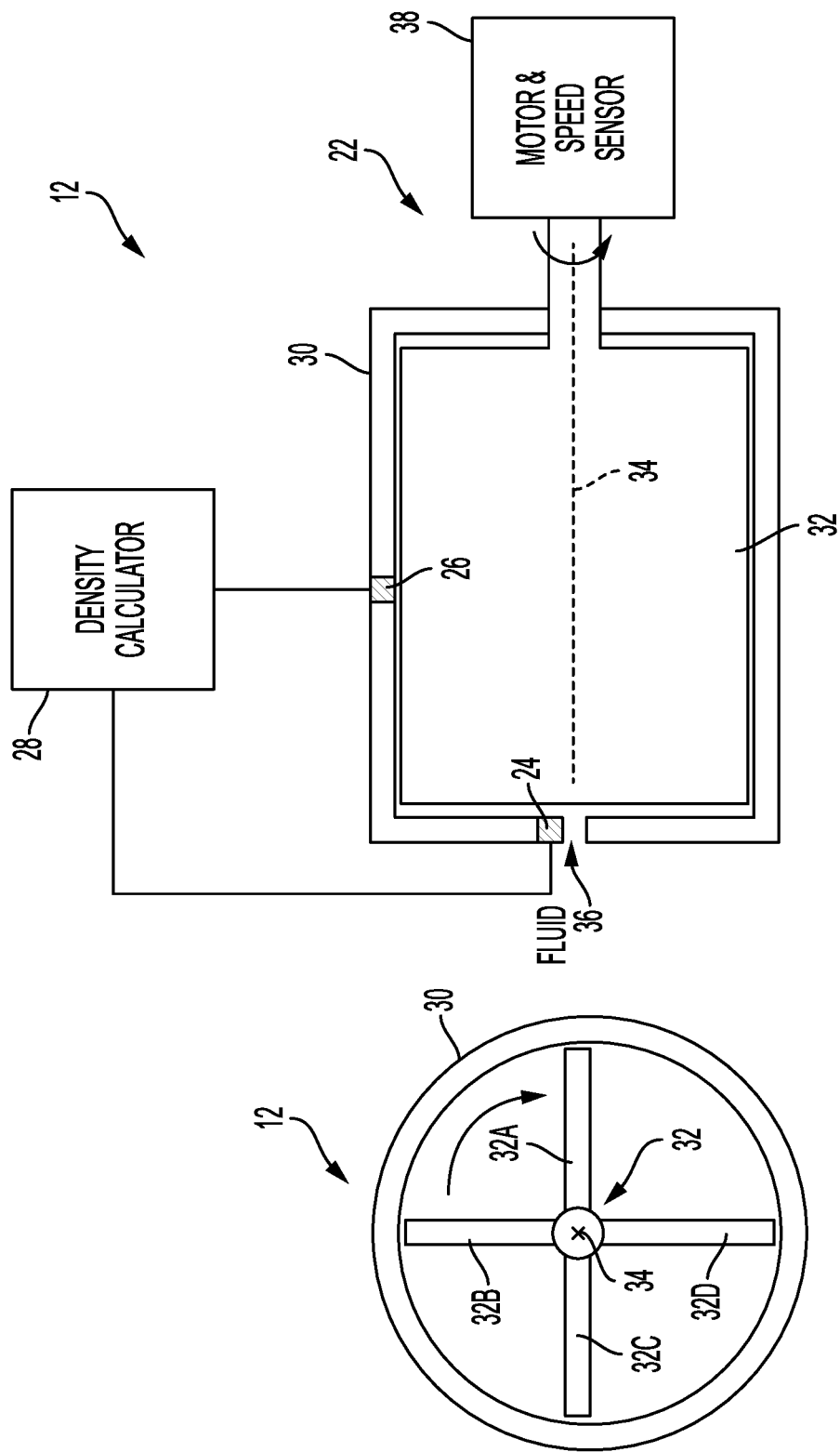
FIG. 2 shows cross-sectional views of a fuel system that simultaneously pumps and measures density of aircraft fuel using a single impeller.

FIG. 2 shows cross-sectional views of a densimeter that measures density of aircraft fuel. In FIG. 2, densimeter 12 includes centrifugal pump 22, first and second pressure sensors 24 and 26, and fuel density calculator 28. Centrifugal pump 22 has pump casing 30 in which resides impeller 32. Pump casing 30 has fuel inlet 36 through which the aircraft fuel is drawn. In some embodiments, pump casing 30 has a fuel outlet through which the aircraft fuel is pumped. The fuel outlet can be used to facilitate circulation of fuel through pump casing 30. Impeller 32 is configured to rotate about impeller axis 34. Impeller 32 has a plurality of blades 32A-32D. Impeller 32, when rotated, causes the aircraft fuel to be circularly rotated within pump casing 30, thereby creating a pressure differential between fuel located near impeller axis 34 and fuel located at a radial periphery of pump casing 30. Impeller 32, when rotated, causes a pressure difference between a first fuel pressure at a first radial distance from the impeller axis 34 and a second fuel pressure at a second radial distance from the impeller axis 34.

First pressure sensor 24 is configured to measure the first fuel pressure, and second pressure sensor 26 is configured to measure the second fuel pressure. Second pressure sensor 24 is further configured to measure second fuel pressure in a radial direction at the pump casing. Density calculator 28 configured to calculate density of the aircraft fuel based on the first and second fuel pressures as measured by first and second pressure sensors 24 and 26.

Densimeter is also depicted in FIG. 2 as having motor and speed sensor 38. In some embodiments, motor and speed sensor 38 can be electrically coupled to densimeter calculator 28, so that densimeter calculator 28 can control the rotational speed of impeller 32.

Centrifugal pump 22 has pump casing 30 in which resides impeller 32. Pump casing 30 has fuel inlet 36 through which the aircraft fuel is drawn and, in some embodiments, a fuel outlet through which the aircraft fuel is pumped. In the depicted embodiment, fuel inlet 36 is aligned near or along impeller axis 34. The fuel outlet, if present, is at a radially distal location of pump casing 30 as measured from impeller axis 34. Impeller 32 is configured to rotate about impeller axis 34. Impeller 32 has a plurality of blades 32A-32D. Impeller 32, when rotated, causes the aircraft fuel to be drawn from fuel inlet 36 and to be expelled through the fuel outlet, if so equipped. Impeller 32, when rotated, also causes a pressure difference between first fuel pressure $P_1$ at a first radial distance $r_1$ from the impeller axis 34 and second fuel pressure $P_2$ at a second radial distance $r_2$ from the impeller axis 34.

As the impeller is rotated, a centrifugal pump imparts a rotational or circumferential component R to flow of the aircraft fuel being pumped. Because of this rotational component, a radial pressure gradient of the pumped fuel is produced. This radial pressure gradient varies for aircraft fuels of different densities. Therefore, such a pressure gradient can be indicative of the density of the aircraft fuel. For systems in which the first fuel pressure is measured along impeller axis 34 (i.e., the radial distance of first pressure sensor 24 from impeller axis 34 is zero: $r_1=0$), such a relation between density D and measured pressures can be given by:

$$D = \frac{2(P_2 - P_1)}{r_2^2 \omega^2}. \qquad (1)$$

Here, $P_1$ is the first fuel pressure, $P_2$ is the second fuel pressure, $r_2$ is the radial distance of second pressure sensor 26 from impeller axis 34, and ω is the rotation frequency of aircraft fuel. The rotational frequency of the aircraft fuel can measured and/or calculated based on a rotational frequency of the impeller as measured by motor and speed sensor 38. In some embodiments, a relation between the rotational frequency of the impeller and the rotational frequency of the aircraft fuel can be based on aircraft fuel dynamics. In some embodiments, the aircraft fuel dynamics of the system are such that the rotational frequency of the impeller and the rotational frequency of the aircraft fuel are substantially equal to one another.

Various embodiments have first and second pressure sensors 24 and 26 located at various radial distances $r_1$ and $r_2$ from impeller axis 34. For example a ratio of the distance $r_1$ to distance $r_2$ can be less than 0.25. 0. 1, 0.05, or it can be 0.00 when first pressure sensor 24 is aligned along impeller axis 34.

In the embodiment in FIG. 2, centrifugal pump 22 is a zero flow pump, having no fuel outlet. For such a zero flow pump, the impeller can be designed to direct the fluid in purely circumferential directions about impeller axis 34. Such circumferential directed impellers can also be used for pumps designed for small flow rates—flow rates that corresponding to operation near zero flow rate as described above. The impeller of such a zero flow pump can have substantial axial mirror symmetry, thereby having to axial direction that is preferential.

In the embodiment depicted in FIG. 2, impeller 32 is an open vane impeller. An open vane impeller has blades, such as blades 32A-32D extending from a central hub. In some embodiments, impeller 32 can be a semi-open vane impeller. A semi-open vane impeller has a plate, which in some embodiments can be substantially circular, affixed to one axial side of impeller blades 32A-32D. In some embodiments, impeller 32 can be a closed vane impeller, which has plates on both axial sides of impeller blades 32A-32D.

First pressure sensor 24 is configured to measure the first fuel pressure, and second pressure sensor 26 is configured to measure the second fuel pressure. Second pressure sensor 26 is further configured to measure second fuel pressure in a radial direction at the pump casing. Such a radial directive sensor can have a sensing membrane that has a normal vector aligned with a radial direction from the impeller axis. For example, the radial directive sensor can have a sensing membrane that is substantially conformal with an inside surface of pump casing 22. Such a sensing membrane can deflect, in response to aircraft fuel pressure, in the radial direction that is parallel to the normal vector of the membrane. Fuel control module 20 can be configured to calculate density of the aircraft fuel based on the first and second fuel pressures as measured by first and second pressure sensors 24 and 26.

In some embodiments, instead of first and second pressure sensors 24 and 26, a differential pressure sensor measure a differential pressure between two different radial locations $r_1$ and $r_2$ from impeller axis 34. For example, instead of pressures sensors 24 and 26 at the radial locations $r_1$ and $r_2$ from impeller axis 34, a differential pressure sensor can be in fluid communication with ports located where pressures sensors 24 and 26 are depicted in FIG. 2.

Figure 3:
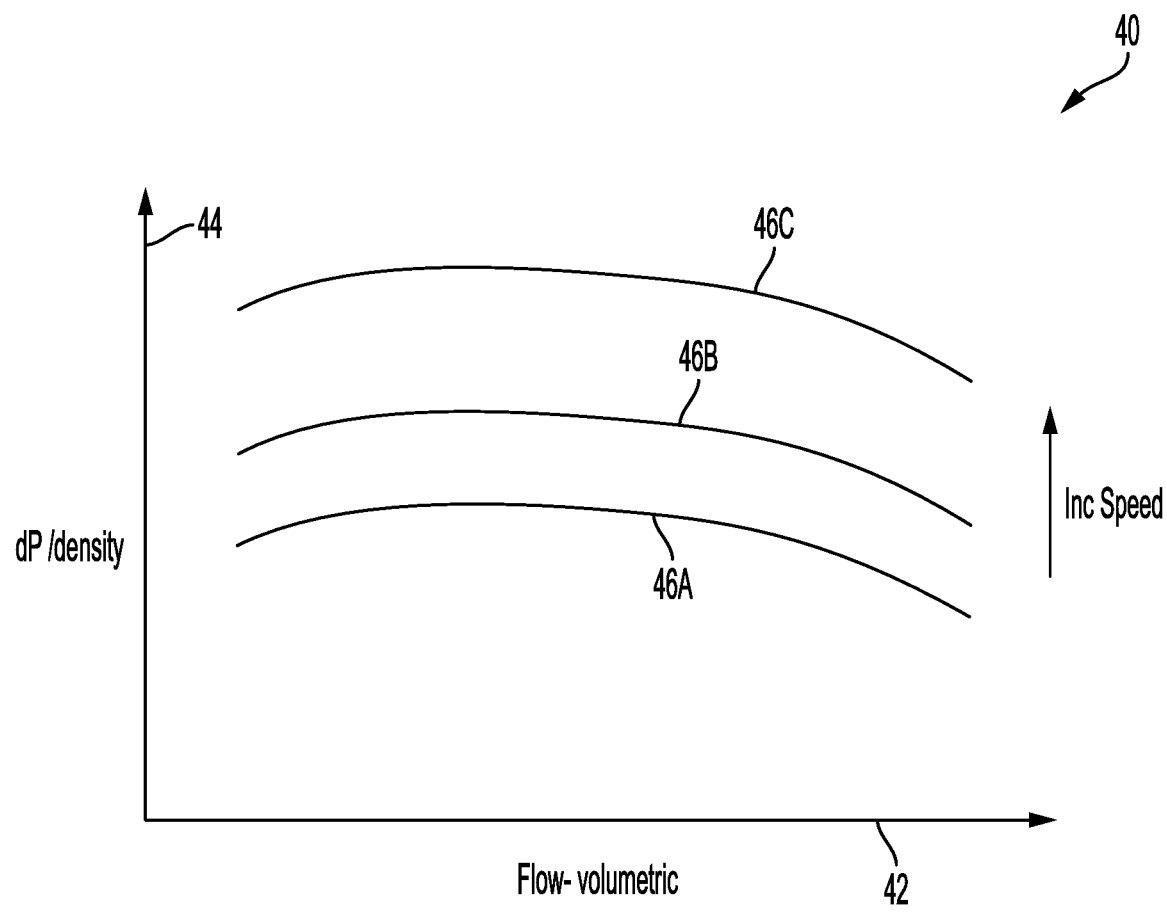
FIG. 3 is a graph depicting a relation between measured differential pressure and fluid flow and/or pump speed.

FIG. 3 is a graph depicting a relation between measured differential pressure and fluid flow and/or pump speed. In FIG. 3, graph 40 include horizontal axis 42, vertical axis 44 and relations 46A, 46B, and 46C. Horizontal axis 42 is indicative of volumetric flow of a fluid being pumped by a centrifugal pump, such as centrifugal pump 22 depicted in FIG. 2. Vertical axis 44 is indicative of measured differential pressure of the fluid being pumped by the centrifugal pump (for a given fluid density). Relations 46A-46C are indicative of relationship s between the measured differential pressure and the volumetric flow of the pumped fluid for different rotational speeds of the pump impeller, such as impeller 32 depicted in FIG. 2.

As depicted in FIG. 3, for a given rotational speed, the measured pressure differential is not constant. For embodiments in which no fluid flow is caused by rotation of impeller 32 (e.g., embodiments having no outlet port), such variable relations are not problematic. In such no-flow embodiments, the only operable point in the relation between measured density and volumetric flow is at the vertical axis where volumetric flow is zero. For embodiments that provide fluid flow via an outlet port, however, rate of fluid flow must be either measured (or otherwise be known), or must be controlled to within a certain range about a target operating point. For example, the flow rate can be maintained near zero by providing a small flowrate, as controlled, for example, by a pinhole orifice in the fuel outlet path. Such a low flow rate can facilitate fuel circulation, while maintaining fluid flow near the target operating point (e.g., near zero). Such a rate of fluid flow can be, for example, a flow rate corresponding to a measured differential pressure being within 0.1%, 0.5%, 1%, or 2% of the differential pressure measured for a zero fluid flow rate, for example.

Figure 4:
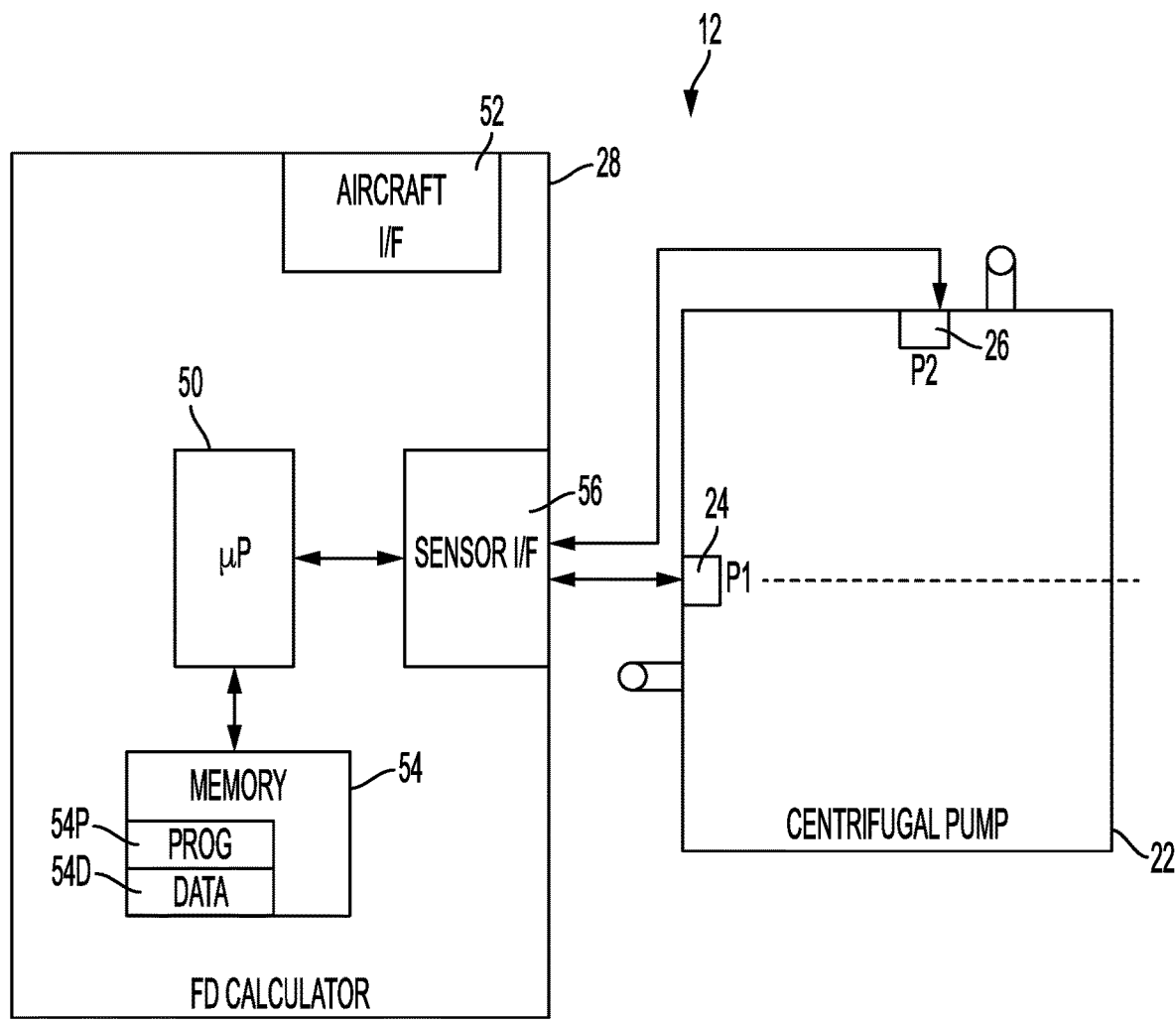
FIG. 4 is a block diagram of fuel system that simultaneously pumps and measures density of aircraft fuel using a single impeller.

FIG. 4 is a block diagram of fuel system that simultaneously pumps and measures density of aircraft fuel using a single impeller. In FIG. 4, fuel system 12 includes centrifugal pump 22, first and second pressure sensors 24 and 26, and fuel density calculator 28. Fuel density calculator includes processor(s) 50, aircraft interface 52, and storage device(s) 54, and sensor interface 56. Processor(s) 50 can receive program instructions 54P from storage device(s) 54. Processor(s) 50 can be configured to calculate fuel density, based on received pressure sensor signals and on program instructions 54P. For example, processor(s) 50 can be configured to receive pressure sensor signals, via sensor interface 56, indicative of measured fuel pressures $P_1$ and $P_2$. Processor(s) 50 can calculate fuel density based on the received pressure sensor signals and provide the calculated density to other aircraft systems via aircraft interface 52.

As illustrated in FIG. 4, fuel density calculator 28 includes processor(s) 50, aircraft interface 52, storage device(s) 54, and sensor interface 56. However, in certain examples, fuel density calculator 28 and/or fuel system 12 can include more or fewer components. For instance, in some embodiments, fuel system 12 can include a tachometer configured to measure a rotational velocity of the impeller and/or a rotational flow measurement sensor. The rotational velocity of the impeller as measured by a tachometer, can be indicative of the rotational frequency of the aircraft fuel. In some embodiments, fuel density calculator can include a flow regulator configured to regulate, based at least in part on the calculated fuel density, fuel flow of the aircraft fuel. In some examples, fuel density calculator 28 can be performed in one of various aircraft computational systems, such as, for example, an existing Full Authority Digital Engine Controller (FADEX) of the aircraft.

Processor(s) 50, in one example, is configured to implement functionality and/or process instructions for execution within fuel density calculator 28. For instance, processor(s) 50 can be capable of processing instructions stored in storage device(s) 54. Examples of processor(s) 50 can include any one or more of a microprocessor, a controller, a digital signal processor(s) (DSP), an application specific integrated circuit (ASIC), a field-programmable gate array (FPGA), or other equivalent discrete or integrated logic circuitry. Processor(s) 50 can be configured to perform fuel density calculations.

Storage device(s) 54 can be configured to store information within fuel density calculator 28 during operation. Storage device(s) 54, in some examples, is described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, storage device(s) 54 is a temporary memory, meaning that a primary purpose of storage device(s) 54 is not long-term storage. Storage device(s) 54, in some examples, is described as volatile memory, meaning that storage device(s) 54 do not maintain stored contents when power to Fuel density calculator 28 is turned off. Examples of volatile memories can include random access memories (RAM), dynamic random access memories (DRAM), static random access memories (SRAM), and other forms of volatile memories. In some examples, storage device(s) 54 is used to store program instructions for execution by processor(s) 50. Storage device(s) 54, in one example, is used by software or applications running on fuel density calculator 28 (e.g., a software program implementing fuel density calculation).

Storage device(s) 54, in some examples, can also include one or more computer-readable storage media. Storage device(s) 54 can be configured to store larger amounts of information than volatile memory. Storage device(s) 54 can further be configured for long-term storage of information. In some examples, storage device(s) 54 include non-volatile storage elements. Examples of such non-volatile storage elements can include magnetic hard discs, optical discs, flash memories, or forms of electrically programmable memories (EPROM) or electrically erasable and programmable (EEPROM) memories.

Aircraft interface 52 can be used to communicate information between fuel density calculator 28 and an aircraft. In some embodiments, such information can include aircraft conditions, flying conditions, and/or atmospheric conditions. In some embodiments, such information can include data processed by fuel density calculator 28, such as, for example, alert signals. Aircraft interface 52 can also include a communications module. Aircraft interface 52, in one example, utilizes the communications module to communicate with external devices via one or more networks, such as one or more wireless or wired networks or both. The communications module can be a network interface card, such as an Ethernet card, an optical transceiver, a radio frequency transceiver, or any other type of device that can send and receive information. Other examples of such network interfaces can include Bluetooth, 3G, 4G, and Wi-Fi radio computing devices as well as Universal Serial Bus (USB). In some embodiments, communication with the aircraft can be performed via a communications bus, such as, for example, an Aeronautical Radio, Incorporated (ARINC) standard communications protocol. In an exemplary embodiment, aircraft communication with the aircraft can be performed via a communications bus, such as, for example, a Controller Area Network (CAN) bus.

Discussion of Possible Embodiments

The following are non-exclusive descriptions of possible embodiments of the present invention.

Apparatus and associated methods relate to a system for measuring density of aircraft fuel. The system includes a centrifugal fluid pump, first and second pressure sensors, and a density calculator. The centrifugal pump includes a pump casing and an impeller. The pump casing defines an interior cavity having substantial rotational symmetry about an impeller axis. The pump casing is configured to be filled with the aircraft fuel. The fuel inlet port is configured to provide fluid communication of the aircraft fuel across the pump casing. The impeller is within the pump casing and configured to rotate about the impeller axis, thereby causing the aircraft fuel to be circumferentially circulated about the impeller axis. The first pressure sensor is located at a first radial distance from the impeller axis and configured to measure a first fluid pressure of the aircraft fuel. The second pressure sensor is located at a second radial distance from the impeller axis and configured to measure a second fluid pressure of the aircraft fuel, wherein a ratio of the first radial distance to the second radial distance is less than 0.2. The density calculator is configured to calculate density of the aircraft fuel based on the first and second fluid pressures.

The system of the preceding paragraph can optionally include, additionally and/or alternatively, any one or more of the following features, configurations and/or additional components:

A further embodiment of the foregoing system, wherein, during operation, a pump flow rate of the centrifugal fluid pump can be zero.

A further embodiment of any of the foregoing systems, wherein the impeller can have axial mirror symmetry, thereby causing the aircraft fuel to be purely circumferentially circulated about the impeller axis.

A further embodiment of any of the foregoing systems, wherein the fuel inlet port can be an aperture located at a third radial distance from the impeller axis. The centrifugal fluid pump can further include a fuel outlet port and a flow restrictor. The fuel outlet port can be located at a fourth radial distance from the impeller axis. The fourth radial distance can be greater than the third radial distance. The flow restrictor can be configured to restrict fluid flow through the centrifugal fluid pump to a pump flow rate corresponding to a measured differential pressure being within 1% of a differential pressure corresponding to a pump flow rate of zero.

A further embodiment of any of the foregoing systems, wherein the flow restrictor can be configured to restrict fluid flow through the centrifugal fluid pump to a pump flow rate corresponding to a measured differential pressure being within 0.1% of a differential pressure corresponding to a pump flow rate of zero.

A further embodiment of any of the foregoing systems, wherein the second radial distance can be greater than a radial extent of the impeller as measured from the impeller axis.

A further embodiment of any of the foregoing systems, wherein the impeller can be an open vane impeller.

A further embodiment of any of the foregoing systems, wherein the impeller can be a semi-open vane impeller.

A further embodiment of any of the foregoing systems, wherein the impeller can be a closed vane impeller.

A further embodiment of any of the foregoing systems, wherein the first radial distance can be zero.

A further embodiment of any of the foregoing systems, wherein the density can be calculated based on the equation:

$$D = \frac{2(P_2 - P_1)}{r_2^2 \omega^2},$$

where $P_1$ is the first fluid pressure, $P_2$ is the second fluid pressure, $r_2$ is the second radial distance, and w is the rotation frequency of aircraft fuel.

A further embodiment of any of the foregoing systems can further include a tachometer configured to measure a rotational velocity of the impeller, the rotational velocity indicative of the rotational frequency of the first fluid.

Some embodiments relate to a method for measuring density of aircraft fuel. The method includes filling a pump casing of a centrifugal fluid pump with a first fluid. The method includes providing, via a fuel inlet port, fluid communication of the aircraft fuel across the pump casing. The method includes rotating an impeller within the pump casing about an impeller axis, thereby causing the first fluid to be circumferentially circulated about the impeller axis. The method includes measuring, via a first pressure sensor located at a first radial distance from the impeller axis, a first fuel pressure. The method includes measuring, via a second pressure sensor located at a second radial distance from the impeller axis, a second fuel pressure, wherein a ratio of the first radial distance to the second radial distance is less than 0.2. The method also includes calculating, via a density calculator, density of the aircraft fuel based on the first and second fuel pressures.

The method of the preceding paragraph can optionally include, additionally and/or alternatively, any one or more of the following features, configurations and/or additional components:

A further embodiment of the foregoing method, wherein, during operation, a pump flow rate of the centrifugal fluid pump can be zero.

A further embodiment of any of the foregoing methods, wherein the impeller can have axial mirror symmetry, thereby causing the aircraft fuel to be purely circumferentially circulated about the impeller axis.

A further embodiment of any of the foregoing methods can further include pumping the aircraft fuel from the fuel inlet port to a fuel outlet port located at a fourth radial distance from the impeller axis, wherein the fourth radial distance can be greater than the third radial distance. The method can further include restricting, via a flow restrictor, fluid flow through the centrifugal fluid pump to a pump flow rate corresponding to a measured differential pressure being within 1% of a differential pressure corresponding to a pump flow rate of zero.

A further embodiment of any of the foregoing methods, wherein the flow restrictor can be configured to restrict fluid flow through the centrifugal fluid pump to a pump flow rate corresponding to a measured differential pressure being within 0.1% of a differential pressure corresponding to a pump flow rate of zero.

A further embodiment of any of the foregoing methods, wherein the first pressure can be measured at a location along the impeller axis.

A further embodiment of any of the foregoing methods, wherein the density can be calculated based on the equation:

$$D = \frac{2(P_2 - P_1)}{r_2^2 \omega^2},$$

where $P_1$ is the first fluid pressure, $P_2$ is the second fluid pressure, $r_2$ is the second radial distance, and w is the rotation frequency of aircraft fuel.

A further embodiment of any of the foregoing methods can further include measuring, via a tachometer, rotational velocity of the impeller, the rotational velocity indicative of the rotational frequency of the aircraft fuel.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system for measuring density of an aircraft fuel, the system comprising:

a zero-flow centrifugal pump including an impeller configured to pump the aircraft fuel, the zero-flow centrifugal pump having a fuel inlet port for providing fluid communication across a pump casing of the zero-flow centrifugal pump but no fuel outlet port, wherein, during operation, the zero-flow centrifugal pump circulates the aircraft fuel in a purely circumferential manner about an impeller axis;

a speed sensing arrangement configured to determine a rotational frequency of the impeller while the zero-flow centrifugal pump is pumping the aircraft fuel;

a pressure sensing arrangement configured to measure pressure at two points within the zero-flow centrifugal pump or a differential pressure between the two points while the zero-flow centrifugal pump is pumping the aircraft fuel; and a processor configured to calculate a density of the aircraft fuel based on the rotational frequency determined by the speed sensing arrangement and either the two measured pressures or the measured differential pressure determined by the pressure sensing arrangement.

2. The system of claim 1, wherein the impeller has axial mirror symmetry, thereby causing the aircraft fuel to be purely circulated in a purely circumferentially about an impeller axis.

3. The system of claim 1, wherein the two points at which the pressure sensing arrangement is configured to measure pressures are located at first and second radial distances $r_1$ and $r_2$ from an impeller axis.

4. The system of claim 3, wherein the second radial distance is greater than a radial extent of the impeller as measured from the impeller axis.

5. The system of claim 1, wherein the impeller is an open vane impeller.

6. The system of claim 1, wherein the impeller is a semi-open vane impeller.

7. The system of claim 1, wherein the impeller is a closed vane impeller.

8. The system of claim 3, wherein the first radial distance is zero.

9. The system of claim 8, wherein the density is calculated based on the equation:

$$D = \frac{2(P_2 - P_1)}{r_2^2 \omega^2},$$

where $P_1$ is a first fluid pressure measured at the first radial distance $r_1=0$, $P_2$ is a second fluid pressure measured at the second radial distance $r_2$, and $\omega$ is the rotation frequency of aircraft fuel.

10. The system of claim 1, wherein the rotational frequency of the impeller is indicative of a rotational frequency of the aircraft fuel about an impeller axis.

11. A method for measuring density of an aircraft fuel, the method comprising:
providing, via a single fuel port, fluid communication across a pump casing of a zero-flow centrifugal pump;
providing no fuel outlet port in the pump casing;
pumping the aircraft fuel with the zero-flow centrifugal pump, wherein, during operation, the zero-flow centrifugal pump circulates the aircraft fuel in a purely circumferential manner about an impeller axis;
measuring pressure at two different points within the zero-flow centrifugal pump;
measuring a rotational frequency of an impeller of the zero-flow centrifugal pump; and
calculating a density of the aircraft fuel based on the rotational frequency measured and the two measured pressures measured.

12. The method of claim 11, wherein the impeller has axial mirror symmetry, thereby causing the aircraft fuel to be purely circulated in a purely circumferentially about an impeller axis.

13. The method of claim 11, wherein the two different points at which pressure is measured are located at first and second radial distances $r_1$ and $r_2$ from an impeller axis.

14. The method of claim 11, wherein a first pressure is measured at a location along the impeller axis.

15. The method of claim 11, the density is calculated based on the equation:

$$D = \frac{2(P_2 - P_1)}{r_2^2 \omega^2},$$

where $P_1$ is a first fuel pressure measured at a first radial distance $r_1=0$, $P_2$ is a second fuel pressure measured at a second radial distance $r_2$, and $\omega$ is the rotation frequency of aircraft fuel.

16. The method of claim 11, wherein the rotational frequency of the impeller is indicative of a rotational frequency of the aircraft fuel about an impeller axis.

* * * * *